United States Patent [19]

Grantham

[11] Patent Number: 4,854,338

[45] Date of Patent: Aug. 8, 1989

[54] BREAKAWAY COUPLING, CONDUIT SYSTEM UTILIZING THE COUPLING AND METHODS OF MAKING THE SAME

[75] Inventor: Rodger P. Grantham, Springfield, Mo.

[73] Assignee: Dayco Products, Inc., Dayton, Ohio

[21] Appl. No.: 209,661

[22] Filed: Jun. 21, 1988

[51] Int. Cl.$^4$ .............................................. F16L 37/28
[52] U.S. Cl. ........................................ 137/68.1; 285/4
[58] Field of Search ....................... 137/68.1; 285/2, 4

[56] References Cited

U.S. PATENT DOCUMENTS

| | | | |
|---|---|---|---|
| 2,906,280 | 9/1959 | Mount | 137/68.1 |
| 3,719,194 | 3/1973 | Anderson et al. | 137/68.1 |
| 3,916,929 | 11/1975 | Brown | 137/68.1 |
| 4,056,117 | 11/1977 | Deeks | 137/68.1 |
| 4,614,201 | 9/1986 | King et al. | 137/68.1 |
| 4,763,683 | 8/1988 | Carmach | 138/68.1 |

*Primary Examiner*—John Fox

*Attorney, Agent, or Firm*—Joseph V. Tassone

[57] ABSTRACT

A breakaway coupling, a conduit system utilizing the coupling and methods of making the same are provided, the breakaway coupling being adapted to be incorporated into a conduit system and comprising a pair of tubular coupling members each having opposed ends one of which is adapted to be interconnected to a part of the conduit system and the other of which is held in sealing and coupling engagement with the other end of the other coupling member until uncoupled therefrom by a certain axial force being created therebetween, the breakaway coupling having a frangible unit holding the coupling members in their coupled engagement until the certain axial force breaks the frangible unit to thereby uncouple the coupling members, the frangible unit comprising a tubular sleeve unit having opposed ends and an annular frangible section intermediate the ends of the sleeve unit that breaks in an annular manner when the certain axial force is applied between the coupling members.

8 Claims, 5 Drawing Sheets

BREAKAWAY COUPLING, CONDUIT SYSTEM UTILIZING THE COUPLING AND METHODS OF MAKING THE SAME

BACKGROUND OF THE INVENTION

1. Field of the Invention

This invention relates to a new breakaway coupling for incorporation into a conduit system, a new conduit system utilizing the breakaway coupling and to new methods of making the same.

2. Prior Art Statement

It is known to provide a breakaway coupling for incorporation into a conduit system and comprising a pair of tubular coupling members each having opposed end means one of which is adapted to be interconnected to a part of the conduit system and the other of which is held in sealing and coupling engagement with the other end means of the other coupling member until uncoupled therefrom by a certain axial force means being created therebetween, the breakaway coupling having frangible means holding the coupling members in their coupling engagement until the certain axial force means breaks the frangible means to thereby uncouple the coupling members. For example, see the King et al, U.S. Pat. No. 4,614,201.

SUMMARY OF THE INVENTION

It is one feature of this invention to provide a new breakaway coupling by utilizing an annular frangible section of a tubular sleeve means in a unique manner.

In particular, it is well known that curb pump hoses and dispenser equipment may become damaged when a vehicle being refueled is moved without first having the dispensing nozzle construction of the hose removed from the vehicle filler pipe. It is also well known that to prevent this type of damage from occurring a dry break coupling can be provided in the hose assembly with such coupling breaking away when a certain axial force means is imposed on the hose assembly, such as would occur when a vehicle attempts to drive away with the dispensing nozzle construction of the hose assembly still disposed within the filler pipe thereof. Such breakaway coupling not only readily breaks away so as to prevent damage to the nozzle construction, the hose and/or the dispenser, but also such breakaway coupling has means to prevent loss of product when the breakaway takes place so as to prevent spillage of the product out of the separated ends of the hose assembly.

Therefore, it was found according to the teachings of this invention, that such a breakaway coupling can include a tubular sleeve means which has an annular frangible section intermediate the ends of the sleeve means that will break in an annular manner when the certain axial force means is applied thereto.

For example, one embodiment of this invention provides a breakaway coupling for incorporation into a conduit system and comprising a pair of tubular coupling members each having opposed end means one of which is adapted to be interconnected to a part of the conduit system and the other of which is held in sealing and coupling engagement with the other end means of the other coupling member until uncoupled therefrom by a certain axial force means being created therebetween, the breakaway coupling having frangible means holding the coupling members in their coupling engagement until the certain axial force means breaks the frangible means to thereby uncouple the coupling members, the frangible means comprising a tubular sleeve means having opposed ends and an annular frangible section intermediate the ends of the sleeve means that breaks in an annular manner when the certain axial force means is applied between the coupling members.

Accordingly, it is an object of this invention to provide a new breakaway coupling for incorporation into a conduit system, the coupling of this invention having one or more of the novel features of this invention as set forth above or hereinafter shown or described.

Another object of this invention is to provide a new method of making a breakaway coupling for incorporation into a conduit system, the method of this invention having one or more of the novel features of this invention as set forth above or hereinafter shown or described.

Another object of this invention is to provide a new conduit system having a breakaway coupling therein, the system of this invention having one or more of the novel features of this invention as set forth above or hereinafter shown or described.

Another object of this invention is to provide a new method of making a conduit system having a breakaway coupling incorporated therein, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
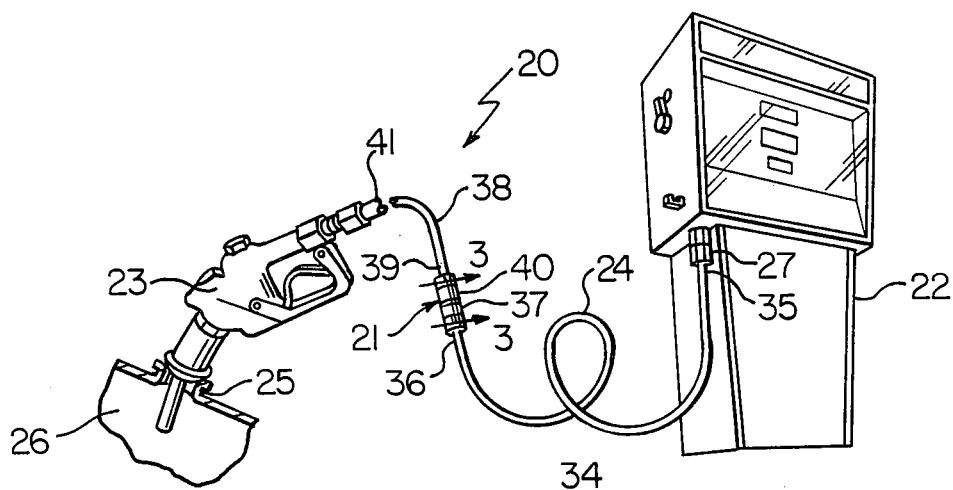
FIG. 1 is a fragmentary perspective view schematically illustrating the new conduit system of this invention.

While the various features of this invention are hereinafter illustrated and described as being particularly adapted to provide a breakaway coupling for a flexible hose assembly of a dispensing gasoline pump arrangement, it is to be understood that the various features of this invention can be utilized singularly or in various combinations thereof to provide a breakaway arrangement for other conduit systems as desired.

Therefore, this invention is not to be limited to only the embodiment illustrated in the drawings, because the drawings are merely utilized to illustrate one of the wide variety of uses of this invention.

Figure 2:
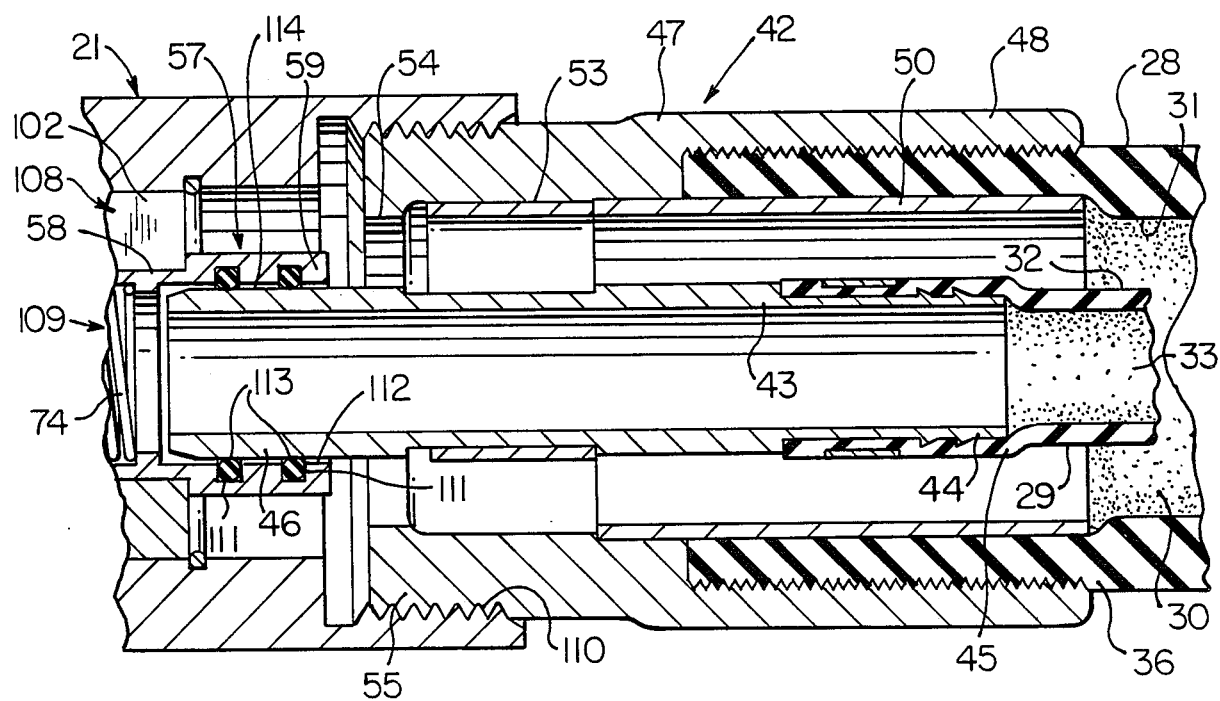
FIG. 2 is an enlarged fragmentary cross-sectional view, partially in cross section, of part of the hose assembly of FIG. 1 and is taken generally in the direction of the arrows 3—3 of FIG. 1.
Figure 3:
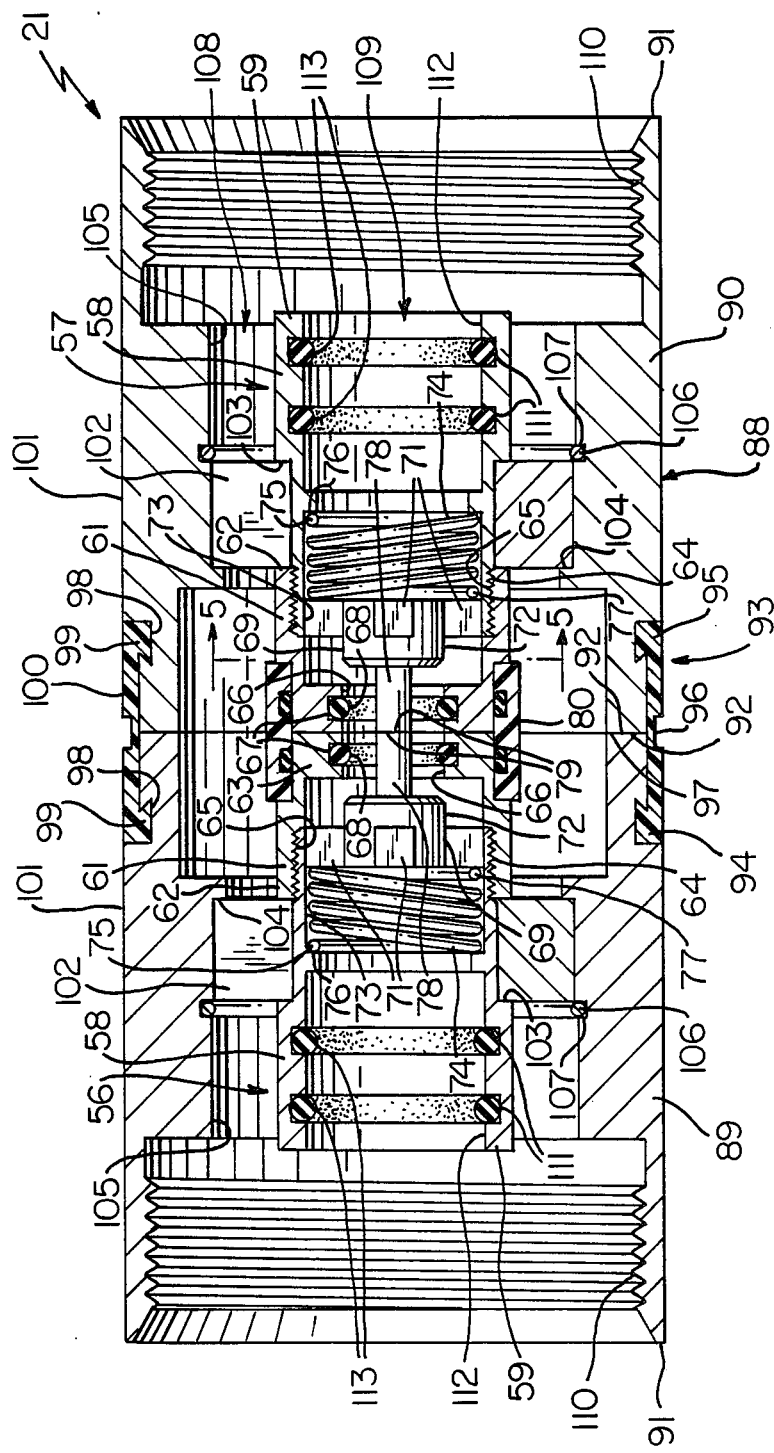
FIG. 3 is an enlarged cross-sectional view of just the breakaway coupling of this invention and is taken generally in the direction of the arrows 3—3 of FIG. 1.
Figure 4:
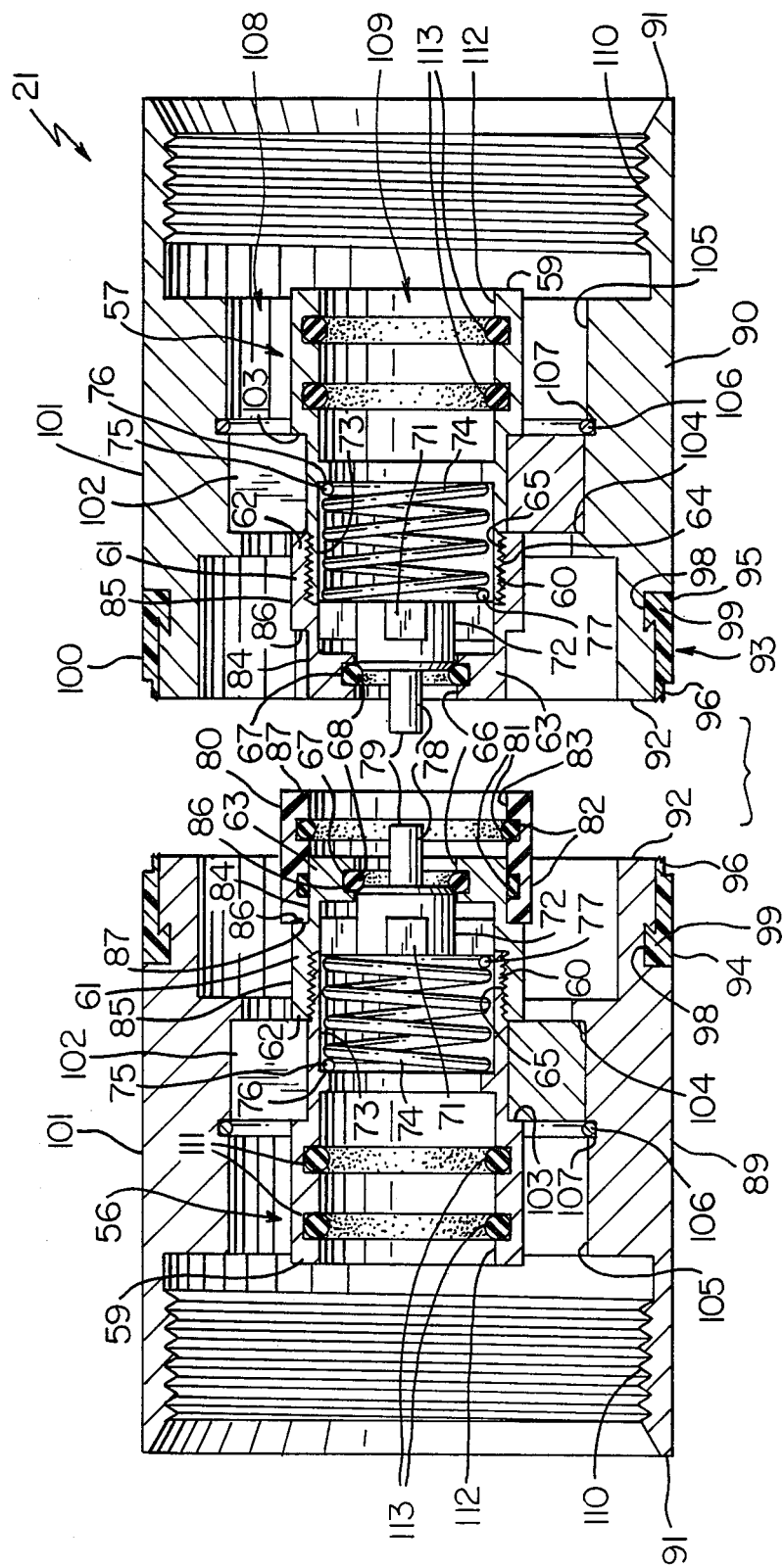
FIG. 4 is a view similar to FIG. 3 and illustrates the breakaway coupling of FIG. 3 after the same has the frangible means thereof broken and the coupling members thereof have been moved apart.

Referring now to FIGS. 1–4, the new conduit system of this invention is generally indicated by the reference numeral 20 and comprises a new breakaway coupling of this invention that is generally indicated by the reference numeral 21 incorporated into the system 20, the system 20 illustrated in FIG. 1 further comprising a conventional curbside fuel dispensing pump means 22 interconnected to a dispensing nozzle construction 23 by a flexible hose means or assembly 24 that has the breakaway coupling 21 therein so that should the nozzle construction 23 be left in the filler pipe 25 of the gasoline storage tank 26 of a transportation vehicle (not shown) or the like and have that transportation vehicle drive away, the breakaway coupling will have a certain axial force imposed thereon to cause the same to uncouple in the manner illustrated in FIG. 4 and thereby tend to prevent damage to the pump means 22, the nozzle construction 23 and the hose assembly 24 as is well known in the art and as set forth in the aforementioned King et al, U.S. Pat. No. 4,614,201, as well as as set forth in the Spinosa et al, U.S. Pat. No. 4,506,862 and the Rabushka et al, U.S. Pat. No. 4,691,941, whereby these three patents are being incorporated into this disclosure by this reference thereto.

Therefore, since the reasons for the use of a breakaway coupling are well known in the art and it is well known that such a breakaway coupling can be disposed anywhere in a conduit system, whether the same is in the medial portion of the hose line 24 as illustrated in FIG. 1, adjacent the pump 22 as represented by the reference numeral 27, adjacent the nozzle construction 23, or even within the conduit system of the pump means 22, a further discussion of the same is deemed unnecessary except as hereinafter set forth in order to fully understand the various features of this invention.

The hose assembly 24 of this invention comprises an outer flexible conduit means or hose 28 and an inner flexible conduit means or hose 29 disposed within the outer hose means 28 so that an outer vapor return passage 30 is defined between the inner peripheral surface 31 of the outer hose 28 and the outer peripheral surface 32 of the inner hose 29 while the product (gasoline) from the dispensing pump 22 is adapted to be directed to the nozzle construction 23 through an internal passage 33 of the inner hose 29. Thus the vapors being created by the product being dispensed into the storage tank 26 of the transportation vehicle are adapted to be returned to the vapor recovery means of the pump means 22 by the outer vapor recovery passage 30 all in a manner well known in the art. For example, see the Basham, U.S. Pat. No. 3,980,112 whereby this patent is being incorporated into this disclosure by this reference thereto.

The hose assembly 24 has a first section 34 thereof that has one end 35 thereof coupled to the pump means 22 and the other end 36 thereof coupled to one end 37 of the breakaway coupling 21 of this invention in a manner hereinafter set forth. The hose assembly 24 also comprises a second section 38 having one end 39 thereof coupled to the other end 40 of the breakaway coupling 21 of this invention and another end 41 thereof coupled to the nozzle construction 23.

The breakaway coupling 21 of this invention is so constructed and arranged in a manner hereinafter set forth that when the same is in its coupling condition as illustrated in FIG. 3, the breakaway coupling 21 has means for interconnecting together the inner passage means 33 between the two hose sections 34 and 38 so that the product from the dispenser 22 can be dispensed by the nozzle construction 23 and has means for interconnecting together the outer passage means 30 between the hose sections 34 and 38 so that the volatile vapors can be returned from the nozzle construction 23 to the dispensing pump 22. However, when the breakaway coupling 21 is caused to separate in the manner illustrated in FIG. 4 by a certain axial force being imposed on the hose assembly 24, such as by the transportation vehicle driving away from the pump means 22 while the nozzle construction 23 is still disposed in the filler pipe 25 of the storage tank 26 thereof, the breakaway coupling 21 of this invention has means for closing off the product passage 33 of the inner hose means 29 at each section 34 and 38 of the separated hose assembly 24 so as to prevent loss of product out of the separated breakaway coupling 21 in a manner hereinafter set forth.

As illustrated in FIG. 2, the end 36 of the hose section 34 includes a coupling arrangement that is generally indicated by the reference numeral 42 and such coupling arrangement 42 is provided at the other end 35 of the hose section 34 as well as at the opposed ends 39 and 41 of the other hose section 38 whereby only the coupling arrangement 42 as illustrated in FIG. 2 will now be described and the same will be described in general terms because the coupling 42 is fully described in detail in the aforementioned Basham, U.S. Pat. No. 3,980,112.

As illustrated in FIG. 2, the coupling 42 comprises an inner metallic tubular member 43 having one end 44 secured in telescoping relation with an adjacent end 45 of the inner hose 29 and having an outer cylindrical end 46 for coupling to any desired structure in a manner hereinafter set forth.

The coupling 42 also comprises an outer metallic tubular member 47 having one end 48 interconnected to an adjacent end 40 of the outer hose 28 by having that outer end 49 sandwiched between the end 48 of the outer coupling member 47 and an internally expanded metal sleeve 50. The outer coupling member 47 has the other end 51 thereof externally threaded at 52 for coupling to the desired structure in a manner hereinafter set forth.

A clip 53 is disposed between the inner tubular member 43 and outer tubular member 47 to not only hold the tubular members 43 and 47 in substantially a concentric manner and prevent axial movement therebetween, but also to provide a continuation of the outer vapor recovery passage 30 from between the inner hose 29 and the outer hose 28 to a cooperating opening 54 disposed at the end 55 of the outer coupling member 47 and the end 46 of the inner tubular member 43 for interconnecting with an outer vapor recovery passage means of the breakaway coupling 21 that is coupled to the coupling means 42 in a manner hereinafter set forth.

The breakaway coupling 21 of this invention as best illustrated in FIGS. 3 and 4 comprises a pair of tubular coupling members that are generally and respectively indicated by the reference numerals 56 and 57, the coupling members 56 and 57 being substantially identical in construction and therefore like parts thereof are indicated by like reference numerals.

Each coupling member 56 and 57 comprises a first tubular member 58 having opposed open ends 59 and 60 and a second tubular member 61 having opposed open ends 62 and 63, the open end 60 of the first tubular member 58 being externally threaded at 64 and being threadedly disposed within the open end 62 of its cooperating tubular member 61 which is internally threaded at 65 as illustrated.

The open end 63 of the second tubular member 61 of each tubular coupling member 56 and 57 has the internal peripheral surface 66 thereof provided with an annular groove 67 therein that receives part of an annular flexible O-ring member 68 that defines a valve seat means at the open end 63 that is adapted to be opened and closed by a movable poppet valve member 69 that has an external frusto-conical surface 70 that is adapted to move into sealing engagement against its respective O-ring 68 as illustrated in FIG. 4.

Figure 5:
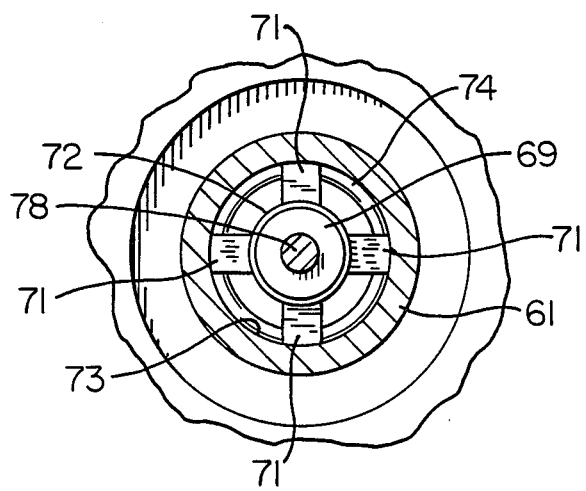
FIG. 5 is a fragmentary cross-sectional view taken on line 5—5 of FIG. 3.

Each poppet valve member 69 has a plurality of radially outwardly directed and equally spaced apart fins 71 extending outwardly from an outer peripheral cylindrical surface 72 thereof to bear in sliding relation against an internal peripheral surface 73 of its respective first tubular member 58 as illustrated in FIGS. 3, 4 and 5 to guide axial movement of that poppet valve member 69, the poppet valve member 69 being urged toward its respective valve seat 68 by a compression spring 74 having one end 75 bearing against an internal annular shoulder means 76 of its respective first tubular member 58 and the other end 77 thereof bearing against the fins 71 of its respective poppet valve member 69.

Each poppet valve member 69 also has a reduced cylindrical abutment means 78 extending outwardly from the center thereof so as to project through its respective valve seat means 68 and have its free end 79 being adapted to abut against the free end 79 of the other poppet valve member 69 in the manner illustrated in FIG. 3 so as to cause the poppet valve members 69 to respectively move to their open positions as illustrated in FIG. 3 in opposition to the force of the compression springs 74 when the tubular coupling members 56 and 57 respectively have the free ends or closed ends 63 of the second tubular members 61 thereof brought into abutting relation when the tubular coupling members 56 and 57 are disposed in their coupling engagement as illustrated in FIG. 3. In this manner, it can be seen that the internal passages formed through the tubular coupling members 56 and 57 are disposed in fluid communication with each other when the tubular coupling members 56 and 57 are disposed in the coupling engagement thereof as illustrated in FIG. 3 and that the internal passages of the tubular coupling members 56 and 57 are respectively closed off at the valve seats 68 thereof by the respective poppet valve members 69 when the tubular coupling members 56 and 57 are uncoupled from each other as illustrated in FIG. 4 in a manner hereinafter set forth.

In order to seal the free ends 63 of the tubular coupling members 56 and 57 to each other when the same are disposed in the coupling engagement as illustrated in FIG. 3, a tubular sleeve 80 formed of any suitable material, such as polymeric material, carries a pair of annular resilient O-ring sealing members 81 in annular grooves 82 formed in spaced apart relation in the internal peripheral surface 83 of the sleeve 80 so that the annular sealing means 81 will respectively seal against external peripheral surfaces 84 of the respective ends 63 of the tubular coupling member 56 or 57 as illustrated, the external peripheral surfaces 84 each being stepped down from another external peripheral surface 85 thereof to define an annular shoulder 86 against which an adjacent end 87 of the sleeve 80 is adapted to abut in the manner illustrated in FIG. 3 when the tubular coupling members 56 and 57 are disposed in the coupling engagement illustrated so that the sleeve 80 completely seals the free ends 63 to each other so that no fluid that passes through the open valve seats 68 can escape to the exterior of the tubular coupling members 56 and 57 at the ends 63 thereof. However, when the tubular coupling members 56 and 57 are moved to their uncoupling position as illustrated in FIG. 4, it can be seen that the sleeve 80 will be carried by one of the tubular coupling members 56 or 57 to permit the tubular coupling members 56 and 57 to be uncoupled from each other for the purpose previously set forth.

The breakaway coupling 21 includes an outer sleeve means of this invention that is generally indicated by the reference numeral 88 and comprises two tubular sleeve parts 89 and 90 that are formed substantially identical to each other and respectively have opposed ends 91 and 92, the ends 92 normally being disposed in abutting relation and being held in such abutting relation by an annular frangible section of the sleeve means 88 that is generally indicated by the reference numeral 93.

The annular frangible section 93 can be formed of any suitable material, and in the embodiment illustrated in the drawings, the frangible sleeve 93 comprises polymeric material and has opposed ends 94 and 95 respectively interconnected to the sleeve parts 89 and 90 in a manner to hold the same together as will be apparent hereinafter. The frangible sleeve has a medial portion 96 overlying the seam 97 defined between the abutting ends 92 of the sleeve parts 89 and 90 to not only seal closed the same, but because the medial portion 96 of the frangible sleeve 93 is reduced in thickness as illustrated, the same is adapted to fracture or rupture in an annular manner completely about the sleeve means 88 so as to permit the sleeve means 88 to break away in two parts when a certain axial force is imposed on the breakaway coupling 21 as would be the case when the transportation vehicle pulls away from the pump means 22 as illustrated in FIG. 1 while the dispensing nozzle construction 23 still remains in the filler pipe 25 of the storage tank 26 as previously set forth so that the hose assembly 24 will separate into the two parts or sections 34 and 38 without causing adverse damage to the dispenser 22 and/or nozzle construction 23 as well as to the hose parts 34 and 38 for the reasons previously set forth.

The ends 92 of the sleeve parts 89 and 90 have been machined or formed in such a manner that the same respectively define annular dovetail grooves 98 therein which respectively receive dovetailing parts 99 of the frangible sleeve 93 in an interlocking manner therewith while an external peripheral surface 100 of the frangible sleeve 93 is disposed substantially flush with external peripheral surfaces 101 of the sleeve parts 89 and 90 as illustrated in FIG. 3, the frangible sleeve 93 being formed by molding the frangible sleeve 93 to the sleeve parts 89 and 90 while the same are disposed in their coupling engagement as illustrated in FIG. 3.

The sleeve parts 89 and 90 of the sleeve means 88 are respectively interconnected to the tubular coupling members 56 and 57 in a like manner so that the sleeve parts 89 and 90 are respectively carried by the tubular coupling members 56 and 57.

In particular, the tubular coupling members 56 and 57 respectively carry annular spider-like members 102 that are respectively secured between the first and second tubular members 58 and 61 thereof by being sandwiched between the ends 62 of the second tubular members 61 and annular shoulder means 103 formed on the first tubular members 58 as illustrated. The sleeve parts 89 and 90 respectively have annular shoulders 104 formed on internal peripheral surfaces 105 thereof against which the spider-like members 102 abut and the other sides of the spider-like members 102 are held in place by split retaining ring means 106 later placed in annular grooves 107 formed in the internal peripheral surfaces 105 of the sleeve parts 89 and 90 as illustrated. In this manner, the spider members 102 not only secure the sleeve parts 89 and 90 to the respective coupling members 56 and 57 so as to be carried thereby, but also the spider-like members 102 provide for fluid flow through the breakaway coupling member 21 outboard of the tubular coupling members 56 and 57 so that an outer passage means 108 is formed completely through the breakaway coupling member 21 while an internal and separate passage means 109 is formed through the breakaway coupling 21 inside of the outer annular passage means 108 so that the inner passage means 109 will form a continuation of and part of the inner product passage means 33 of the completed hose assembly 24 and the outer annular passage means 108 of the breakaway coupling 21 will form a continuation of and part of the outer vapor recovery passage means 39 of the completed hose assembly 24 in a manner later to be described.

The ends 91 of the sleeve parts 89 and 90 of the coupling 21 are respectively internally threaded at 110 and the first tubular members 58 of the tubular coupling members 56 and 57 respectively have a plurality of spaced apart annular grooves 111 formed in internal peripheral surfaces 112 thereof and respectively carrying resilient O-ring sealing members 113 which extend out of the grooves 111 in a manner to respectively seal against external peripheral surfaces 114 of the ends 46 of the tubular member 43 of the couplings 42 of the hose parts 34 and 38 when coupled to the respective ends 37 and 40 of its breakaway coupling 21 of this invention as illustrated in FIG. 1.

In particular, it can be seen that the breakaway coupling 21 of this invention can be made by the method of this invention as previously set forth so that the same is a self-contained unit as illustrated in FIG. 3 with the frangible sleeve 93 holding the two sleeve parts 89 and 90 and, thus, the tubular coupling members 56 and 57 in the coupling engagement thereof as illustrated so that the adjacent couplings 42 of the hose parts 34 and 38 can be readily assembled thereto as illustrated in FIG. 2.

For example, the tubular member 43 of the adjacent coupling 42 has its end 46 telescoped within the end 59 of its tubular coupling member 57 of the coupling 21 to have its external peripheral surface 114 disposed in sealing engagement against the sealing means 113 as the outer coupling member 47 has its threaded end 51 threaded to the internal threads 110 at the adjacent end 91 of the sleeve part 90 of the sleeve means 88 of the breakaway coupling means 21 so as to firmly secure the right-hand end 91 of the breakaway coupling 21 to the coupling 42 of the hose section 34 and thereby place the internal passage 109 of the tubular coupling members 56 and 57 in fluid communication with the internal product passage 33 of the inner hose means 29 and the outer fluid passage 108 of the breakaway coupling 21 in fluid communication with the outer vapor recovery passage 30 of the outer hose means 28 as illustrated in FIG. 2. The left-hand end 91 of the breakaway coupling 21 is, of course, coupled to its coupling means 42 of its hose section 38 in the same manner as illustrated in FIG. 2 and need not be further described.

Therefore, it can be seen that the breakaway coupling 21 of this invention can readily form part of the hose assembly 24 so that the same will provide a continuation therethrough of the product path 33 and the vapor recovery path 30 for the intended purpose of the hose assembly 24 in delivering the product from the dispenser 22 to the dispensing nozzle construction 23 and returning vapors of the volatile liquid back to the vapor recovery means of the pump means 22 through the outer vapor recovery path 30 all in a manner and for the purpose as previously set forth.

However, should a certain axial force be placed on the breakaway coupling 21 of this invention, such as by a person tending to drive away from the dispensing pump 22 while the dispensing nozzle construction 23 is still disposed in the filler pipe 25 of the storage tank 26 thereof, the breakaway coupling 21 will fracture in an annular manner completely around the frangible sleeve 93 in the reduced thickness area 96 thereof in the manner illustrated in FIG. 4 so that the sleeve parts 89 and 90 as well as their respective tubular coupling members 56 and 57 will respectively remain with the now separated hose sections 34 and 38, the poppet valve members 69 under the force of the springs 74 respectively closing off the inner passages 109 at the valve seats 68 of the separated coupling means 56 and 57 so as to prevent product within the separated hose sections 34 and 38 from spilling out of the hose sections 34 and 38. Thus, the hose section 38 will remain with the nozzle construction 23 and the hose section 34 will remain with the dispenser 22 so that damage to the same is prevented by the breakaway coupling 21 of this invention.

The breakaway coupling 21 of this invention is adapted to be repaired after the same has been fractured in the manner illustrated in FIG. 4 because the remaining parts of the frangible sleeve 93 can be removed from the respective sleeve parts 89 and 90 by machining or the like and the sleeve parts 89 and 90 can then be disposed in abutting coupling relation thereof so that another frangible sleeve 93 can be molded in place whereby the repaired breakaway coupling 21 can be utilized in the manner previously described for another hose assembly 24 as desired.

While the frangible sleeve 93 of this invention has been previously described as being molded in place to form the breakaway coupling 21, it is to be understood that the frangible sleeve 93 could be preformed and be secured to the housing parts 88 and 90 in any desired manner.

Figure 6:
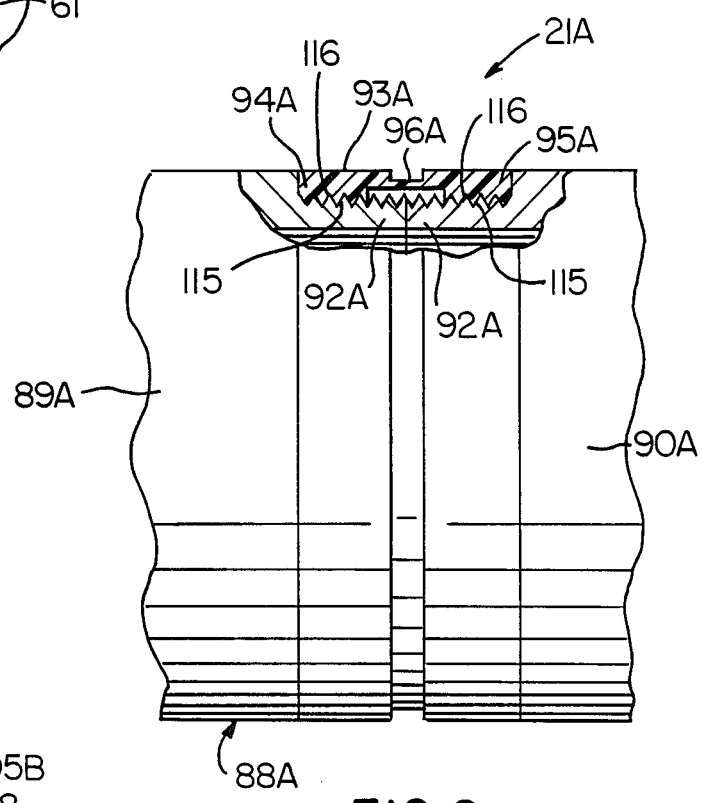
FIG. 6 is a fragmentary view, partially in cross section, illustrating another breakaway coupling of this invention.

For example, reference is now made to FIG. 6 wherein another breakaway coupling of this invention is generally indicated by the reference numeral 21A and parts thereof similar to the breakaway coupling 21 previously described are indicated by like reference numerals followed by the reference letter "A".

As illustrated in FIG. 6, the breakaway coupling 21A is substantially identical to the breakaway coupling 21 previously described except that the frangible sleeve 93A thereof does not have the dovetailed sections 99 on the opposed ends 94A and 95A thereof as the same are internally threaded respectively at 115 to thread against external threads 116 respectively formed on the adjacent ends 92A of the sleeve parts 89A and 90A of the sleeve means 88A of the breakaway coupling 21A. However, the frangible sleeve 93A has the annular frangible section 96A for the purpose previously described to permit the breakaway coupling 21 to fracture in an annular manner at the annular section 96A for the reasons previously set forth.

Figure 7:
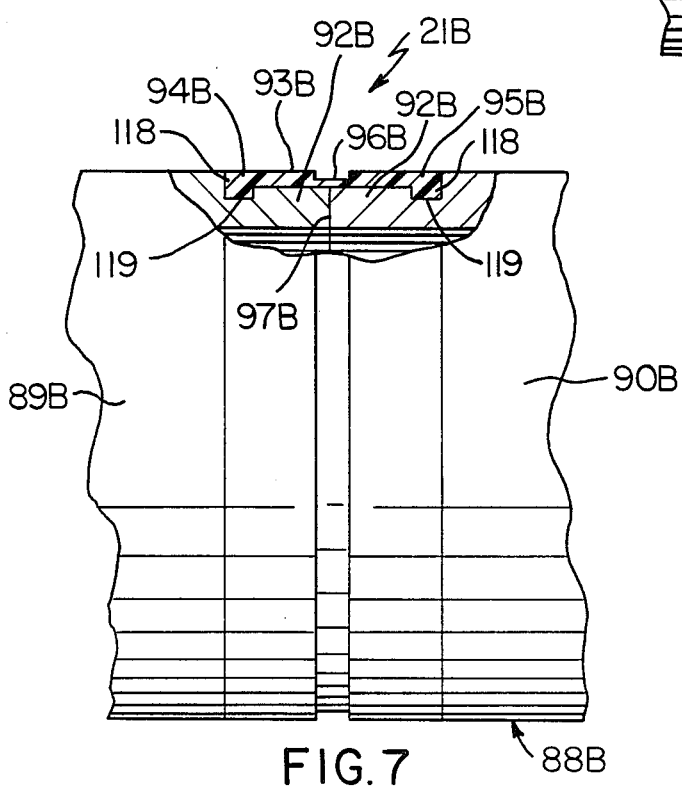
FIG. 7 is a view similar to FIG. 6 and illustrates another breakaway coupling of this invention.

Reference is now made to FIG. 7 wherein another breakaway coupling of this invention is generally indicated by the reference numeral 21B and parts thereof similar to the breakaway coupling 21 previously described are indicated by like reference numerals followed by the reference letter "B".

As illustrated in FIG. 7 the frangible sleeve 93B, instead of having the dovetail sections 99 at the respective ends 94B and 95B as in the breakaway coupling 21, has snap-fit sections 118 for respectively snap-fitting in snap-fitting grooves 119 formed at the ends 92B of the sleeve parts 89B and 90B as illustrated, the sleeve 93B still having the frangible annular section 96B of reduced thickness overlying the seam 97B of the sleeve means 88B for fracturing in the manner previously set forth.

Thus, it can be seen in FIG. 7 that after the sleeve 93B has been preformed, the same is adapted to have the end sections 118 thereof respectively snap-fitted into the grooves 119 of the sleeve parts 89B and 90B as the same are respectively brought together and telescoped within the ends 94B and 95B of the sleeve 93B as illustrated.

While the various frangible sleeves of this invention have been previously described and illustrated as being separate from and then formed or interconnected to the sleeve parts 89 and 90, it is to be understood that the frangible section of this invention could be integral and homogenous with the sleeve parts 89 and 90 so as to be one-piece therewith.

Figure 8:
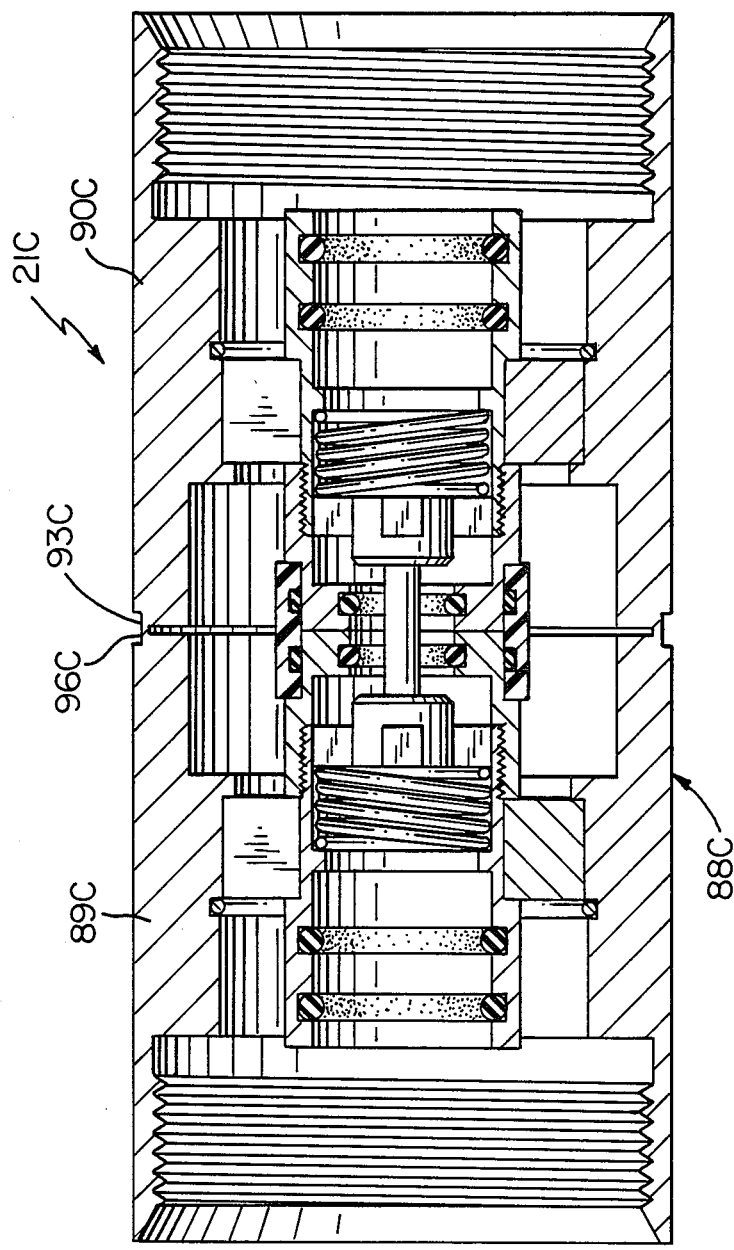
FIG. 8 is a view similar to FIG. 3 and illustrates another breakaway coupling of this invention.

For example, reference is now made to FIG. 8 wherein another breakaway coupling of this invention is generally indicated by the reference numeral 21C and parts thereof similar to the breakaway coupling 21 previously described are indicated by like reference numerals followed by the reference letter "C".

As illustrated in FIG. 8, the breakaway coupling 21C is substantially identical to the breakaway coupling 21 previously described except that the outer sleeve means 88C thereof has a reduced thickness annular section 93C that is integral and homogenous with the material of the sleeve parts 89C and 90C so that the section 93C is one-piece therewith and will fracture in an annular manner when a certain axial force is placed on the breakaway coupling 21C in substantially the same manner that the annular portion 96 of the sleeve 93 as previously described.

Therefore, it can be seen that this invention not only provides new breakaway couplings and new conduit systems utilizing such couplings, but also this invention provides new methods of making such breakaway couplings and such conduit systems.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a breakaway coupling for incorporation into a conduit system and comprising a pair of tubular coupling members each having opposed end means one of which is adapted to be interconnected to a part of said conduit system and the other of which is held in sealing and coupling engagement with the other end means of the other coupling member until uncoupled therefrom by a certain axial force means being created therebetween, said breakaway coupling having frangible means holding said coupling members in their coupling engagement until said certain axial force means breaks said frangible means to thereby uncouple said coupling members, said frangible means comprising a tubular sleeve means having opposed ends and an annular frangible section intermediate said ends of said sleeve means that breaks in an annular manner when said certain axial force means is applied between said coupling members, said frangible section comprising a tubular sleeve that is disposed in telescoped relation on said sleeve means and has opposed ends that are respectively disposed in spaced inboard relation relative to said ends of said sleeve means, said sleeve having an annular frangible area between said ends of said sleeve, said sleeve means having two parts respectively provided with free ends disposed adjacent each other and respectively having said opposed ends of said sleeve means outboard of said free ends, said sleeve having said ends thereof provided with means respectively interconnected to said free ends of said two parts, the improvement wherein said sleeve is threaded onto said sleeve means.

2. A breakaway coupling as set forth in claim 1 wherein said parts of said conduit system that said coupling members are adapted to be interconnected to comprise an inner conduit means that is disposed within an outer conduit means of said system, said opposed ends of said sleeve means having means adapted to be respectively interconnected to parts of said outer conduit means.

3. A breakaway coupling as set forth in claim 1 wherein said sleeve is formed of polymeric material.

4. A breakaway coupling as set forth in claim 1 wherein each of said coupling members has a fixed valve seat means and a movable valve seat means whereby said valve seat means of said coupling members must both be open before a certain fluid flow can pass through said coupling members, each of said coupling members having spring means operatively associated with its respective valve member to tend to move that valve member to its closed position, each of said coupling members having abutment means for engaging said valve member of the other coupling member and moving the same to its open position in opposition to its respective spring means as said coupling members are being disposed in their said coupling engagement.

5. In a conduit system having a breakaway coupling incorporated therein and comprising a pair of tubular coupling members each having opposed end means one of which is interconnected to a part of said conduit system and the other of which is held in sealing and coupling engagement with the other end means of the other coupling member until uncoupled therefrom by a certain axial force means being created therebetween, said breakaway coupling having frangible means holding said coupling members in their coupling engagement until said certain axial force means breaks said frangible means to thereby uncouple said coupling members, said frangible means comprising tubular sleeve means having opposed ends and an annular frangible section intermediate said ends of said sleeve means that breaks in an annular manner when said certain axial force means is applied between said coupling members, said frangible section comprising a tubular sleeve that is disposed in telescoped relation on said sleeve means and has opposed ends that are respectively disposed in spaced inboard relation relative to said ends of said sleeve means, said sleeve having an annular frangible area between said ends of said sleeve, said sleeve means having two parts respectively provided with free ends disposed adjacent each other and respectively having said opposed ends of said sleeve means outboard of said free ends, said sleeve having said ends thereof provided with means respectively interconnected to said free ends of said two parts, the improvement wherein said sleeve is threaded onto said sleeve means.

6. A conduit system as set forth in claim 5 wherein said parts of said conduit system that said coupling members are interconnected to comprise an inner conduit means that is disposed within an outer conduit means of said system, said opposed ends of said sleeve means having means respectively interconnected to parts of said outer conduit means.

7. A conduit system as set forth in claim 5 wherein said sleeve is formed of polymeric material.

8. A conduit system as set forth in claim 5 wherein each of said coupling members has a fixed valve seat means and a movable valve member for opening and closing its respective said valve seat means whereby said valve seat means of said coupling members must both be open before a certain fluid flow can pass through said coupling members, each of said coupling members having spring means operatively associated with its respective valve member to tend to move that valve member to its closed position, each of said coupling members having abutment means for engaging said valve member of the other coupling member and moving the same to its open position in opposition to its respective spring means as said coupling members are being disposed in their said coupling engagement.

* * * * *